United States Patent [19]

Ascoli

[11] 4,092,581

[45] May 30, 1978

[54] RECHARGEABLE BATTERY-OPERATED SHAVER WITH PRINTED CIRCUIT MODULE MOUNTING BRUSH MEANS, BATTERIES AND SWITCH MEANS

[75] Inventor: Enzo Ascoli, Lausanne, Switzerland

[73] Assignee: The Gillette Company, Boston, Mass.

[21] Appl. No.: 765,200

[22] Filed: Feb. 3, 1977

[30] Foreign Application Priority Data

Feb. 18, 1976 United Kingdom .................. 6308/76

[51] Int. Cl.[2] ........................ H02J 7/00; H02K 5/14; H02K 7/14

[52] U.S. Cl. .......................................... 320/2; 310/50; 310/239; 310/242

[58] Field of Search ....................................... 320/2-5; 310/50, 239, 242, 68

[56] References Cited

U.S. PATENT DOCUMENTS

| | | | |
|---|---|---|---|
| 2,963,598 | 12/1960 | Kent | 310/50 |
| 3,403,440 | 10/1968 | Omori et al. | 310/50 X |
| 3,924,147 | 12/1975 | Tarnow et al. | 310/239 X |
| 3,973,179 | 8/1976 | Weber et al. | 310/50 X |

*Primary Examiner*—Robert J. Hickey
*Attorney, Agent, or Firm*—Richard A. Wise; O. J. Bratlie; Donald E. Mahoney

[57] ABSTRACT

A battery-powered electric dry shaver comprising an electric motor, two rechargeable batteries, a switch and a printed circuit board, all mounted in a casing. The motor includes conductive brush supports mechanically mounted on said board in direct electrical connection with respective conductive tracks of said board. The batteries are mechanically mounted on said board with their terminals in direct electrical connection with respective conductive tracks of said board. The switch includes a conductive switching element mounted on said board for movement between an "OFF" position and an "ON" position in which the switching element electrically interconnects two of said tracks, whereby to connect said battery terminals to said brush supports through said switching element and said tracks, no flexible conductive leads being employed.

15 Claims, 7 Drawing Figures

RECHARGEABLE BATTERY-OPERATED SHAVER WITH PRINTED CIRCUIT MODULE MOUNTING BRUSH MEANS, BATTERIES AND SWITCH MEANS

BACKGROUND OF THE INVENTION

This invention relates to battery-powered electric dry shavers.

In shavers of the foregoing type, the interconnection of the various electrical components presents problems, as regards both assembly during manufacture and the difficulties presented by and skill required for servicing. The complications involved in the electrical interconnections result largely from the fact that the arrangement and positioning of the individual components have to satisfy different requirements to which the electrical interconnection must be adapted. For instance the positioning of the motor must satisfy the requirements of the mechanical cutter drive system, whereas the positioning of an ON/OFF switch is determined by the consideration of ease of handling, a charging signal lamp, if provided, must satisfy requirements of good visibility, the positioning of a charge lead connector must be compatible with the charging system associated with the shaver, and so on.

An object of the invention is to provide an electric dry shaver with an improved arrangement for interconnecting various components of the shaver, which is readily compatible with the general requirements for positioning of such components and which contributes to simplification of the assembly, servicing and repair of the shaver.

SUMMARY OF THE INVENTION

According to the present invention there is provided a battery-powered electric dry shaver comprising an electric motor, a rechargeable battery means, a switch and a printed circuit board all mounted in a casing, said motor including conductive brush supports mechanically mounted on said board in direct electrical connection with first and second conductive tracks of said board, said battery means being mounted with its positive and negative terminals respectively in electrical connection with the first conductive tracks and a third conductive track of said board, said switch including a conductive switching element mounted on said board for movement between an off position and an on position in which the switching element electrically interconnects said second conductive track to said third conductive track of said board, whereby to connect said battery terminals to said brush supports through said switching element and said tracks.

The shaver may include a charging terminal disposed in a socket which is adapted to receive a contact pin of a battery charger, said terminal being electrically connected to said second conductive track of said board.

Said brush supports may be mechanically mounted on said board by means of conductive screws extending through apertures through said board in electrical contact with the first and second conductive tracks and into threaded bores in said brush supports.

Said switch may include a finger-operable element exposed to the exterior of said casing, mechanical means operably interconnecting said finger-operable element and said conductive switch element, said mechanical means including a portion resiliently urged into engagement with said conductive switch element, whereby there is no mechanical attachment between said mechanical means and said conductive switch element.

In one embodiment of the shaver, said battery means includes two batteries, each being generally cylindrical and disposed in the casing on opposite sides of the motor substantially parallel to the axis of rotation of the motor with the battery terminals and motor brush supports at the same end of the casing, and mounted on said printed circuit board extending laterally within the casing adjacent said end thereof.

A preferred embodiment of the invention is illustrated in the accompanying drawings and will now be described, by way of example, with reference thereto. In the drawings:

Figure 1:
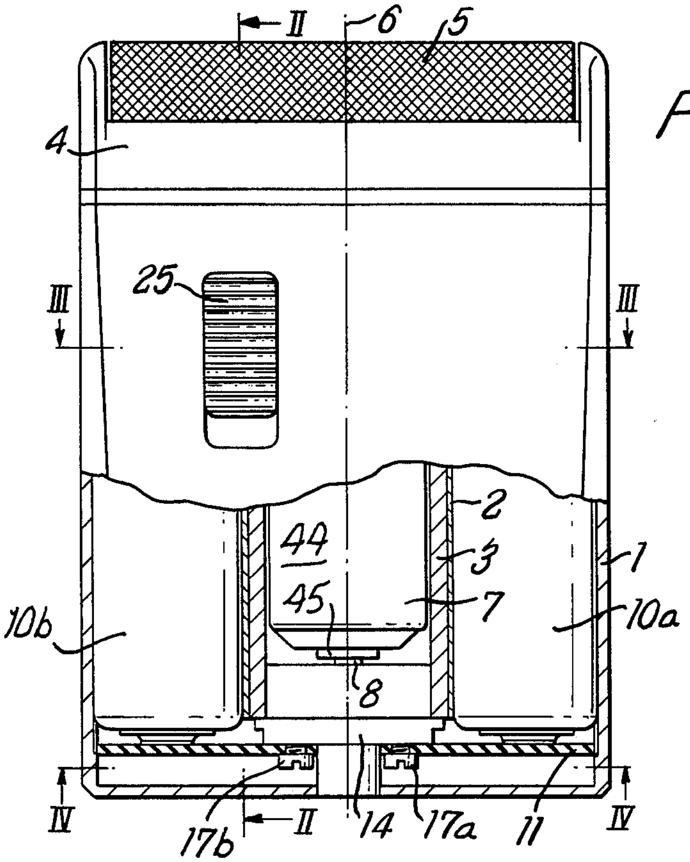
FIG. 1 is a front view of the shaver, shown partly sectioned on the line I—I in FIG. 3.
Figure 3:
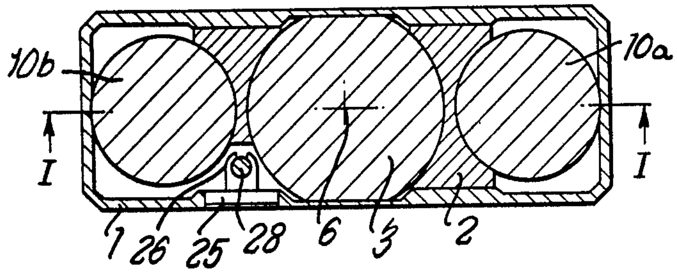
FIG. 3 is a cross-sectional view on the line III—III in FIG. 1, various sectioned elements being shown diagramatically as solid bodies of appropriate external shape.

Referring to the drawings, there is shown a battery-powered electric dry shaver. A casing 1 of the shaver surrounds and locates a frame 2 which in turn supports and locates a soft iron core 3 or yoke providing a magnetic flux path in an integrated electric motor 44. The motor 44 drives a cutter mechanism (not shown) which cooperates with a shaving foil 5 on a cutter head 4 to cut hair in a known manner. The rotational drive axis 6 of the motor 44 is disposed vertically in a normal upright position of the shaver as illustrated in the drawings. As an example, motor 44 is of the bell-shaped type having a central armature 7 disposed within the core 3, and having a commutator 8 mounted at the lower end 45 of the armature 7. Two generally cylindrical batteries 10*a*, 10*b* of rechargeable type are positioned parallel to the axis 6 of the motor and are disposed on opposite sides thereof as shown in FIGS. 1 and 3.

Figure 2:
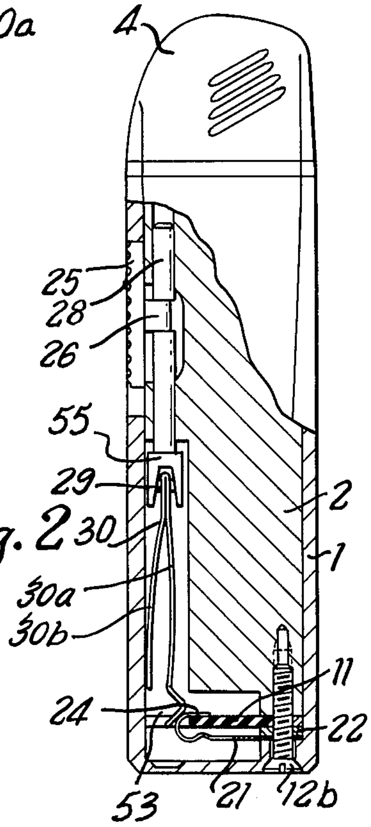
FIG. 2 is a side view partly sectioned on the line II—II in FIG. 1.
Figure 4:
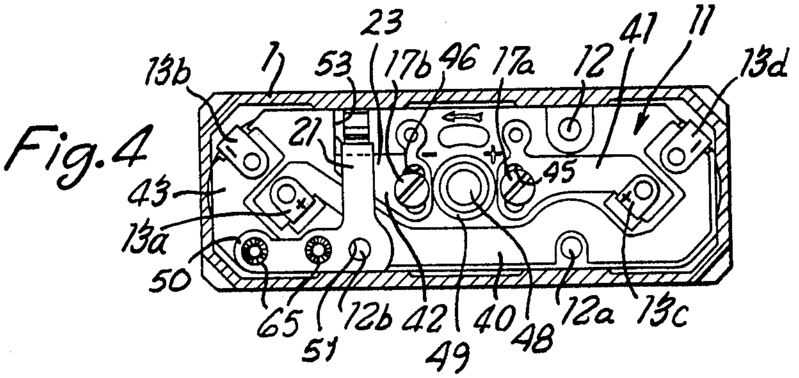
FIG. 4 is a sectional view on the line IV–IV in FIG. 1, presenting an underneath view of a printed circuit board of the shaver.
Figure 7:
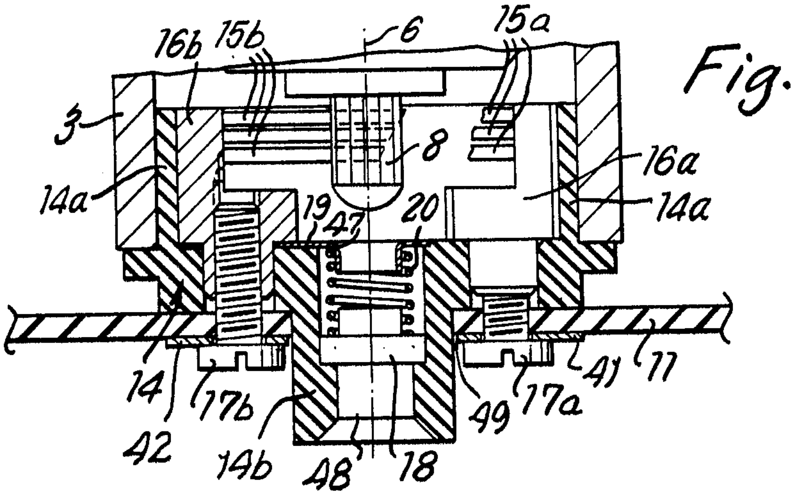
FIG. 7 is a broken sectional view showing constructional detail of the lower part of the shaver including the motor brush supports.

Referring to FIGS. 2, 4, and 7, there is shown a printed circuit board 11 secured to the frame 2 by screws, not shown, inserted through holes 12, 12*a* in board 11 and screwed into the frame 2. The screws also serve to secure the frame 2 in position within the casing 1. The board 11 is provided with openings large enough to receive the positive terminals 13*a*, 13*c* of each of the batteries 10*a*, 10*b*. The negative terminals 13*b*, 13*d* of each battery 10*a*, 10*b* are bent around the edge of the board 11. All four battery terminals 13*a*, 13*b*, 13*c*, 13*d* are also soldered to appropriate conductive tracks of the circuit board 11 as shown in FIG. 4, thereby providing direct electrical connections of the battery terminals 13*a*, 13*b*, 13*c*, and 13*d* to the conductive tracks 40, 41 and 43 and mechanically mounting the batteries 10*a*, 10*b* to the circuit board 11.

The motor 44 has a brush holder 14 of electrically insulating material secured to the circuit board in a manner described below and which is adjusted and centred on the motor core 3. The brush holder 14 carries positive and negative conductive brush supports 16a and 16b which in turn support positive and negative brush sets 15a and 15b for cooperation with the motor commutator 8. As shown in FIGS. 1 and 7, the brush holder 14 has a cylindrical shell portion 14a received within the soft iron core 3 to locate the holder 14 relative to the axis of rotation 6 of the motor 44. The brush holder 14 also has a stub portion 14b extending in the opposite direction 49 in an aperture through the board 11 to locate the circuit board 11 relative to the brush holder 14.

The brush supports 16a, 16b and brush holder 14 are mounted on the board 11 by means of conductive screws 17a, 17b passing through the circuit board 11 in electrical contact with appropriate conductive tracks 41 and 42, respectively, of the printed circuit, thereby establishing direct electrical connections between the conductive tracks 41, 42 and the motor brush sets 15a and 15b, respectively. As can be seen in FIG. 4, the screws 17a, 17b pass through arcuate clearance holes 45 and 46, respectively in the board 11 thereby allowing angular adjustment of the brush supports 16a, 16b about the motor axis 6. As can be seen from FIG. 7, the brush support 16b is electrically connected to a central conductive contact 18 in the brush holder 14 through a metallic connecting piece 19 and a spring 20 which resiliently loads the contact 18. The connecting piece 19 is clamped between the corresponding brush support 16b and the brush holder 14 and provides an inner spring abutment 47 at which the connecting piece 19 is in electrical contact with the spring 20.

The contact 18 positioned in a socket 48 provided within the stub portion 14b of the brush holder 14, which stub portion 14b projects through the aperture 49 in the board 11 and terminates flush with the outer surface of the casing 1. The socket 48 is adapted to receive a rigid contact pin, not shown, of an associated battery charger. The charger pin marks an electrical connection with contact 18. Thus, contact 18 provides one charging terminal. A second charging terminal is constituted by the casing 1 itself, if the casing is of metal, or by the head of the screw 12b if the casing 1 is made of insulating material since the screw 12b is arranged to pass through a switching element aperture 51 and electrically contact the switching element 21 and thus the conductive track 43 and the negative terminal 13b of the battery 10b when the screw 12b is twisted into a threaded bore in the frame as shown in FIGS. 2 and 4. Thus, the polarity of the charging current is always the same whatever the orientation of the shaver when placed on the charger.

Referring to FIGS. 1, 2, 4, 5 and 6, there is shown an ON/OFF switch through which the printed circuit, including conductive tracks 40, 41, 42 and 43 on the board 11 connects the motor 44 to the batteries 10a, 10b. The ON/OFF switch comprises a button 25 exposed to the exterior of the casing 1 and which constitutes a finger-operable element through which the switching action is effected. The button 25 mechanically drives a conductive switching element 21 movably mounted on the printed circuit board 11, this element 21 being in the form of a flexible metallic leaf contact rigidly fixed at one end 50 to the lower side of the board 11. The fixed end 50 of the leaf contact 21 makes permanent electrical contact with a track 43 of the printed circuit by means of rivets 65 and metallic distance pieces 22 of the type shown under element 21. The end 52 of the leaf contact 21 is free and has a U-shaped configuration which straddles the board 11 and passes through a cut-out edge slot 53 in the board. The contact 21 has alternative positions, namely the "OFF" position shown in FIG. 5, in which the portion 24 of end 52 of the contact 21 engages the upper surface 53 of the board 11, and the "ON" position shown in FIG. 6. In the "ON" position 54 and upwardly convex portion of the contact 21 engages a conductive track portion 23 as shown.

Figure 5:
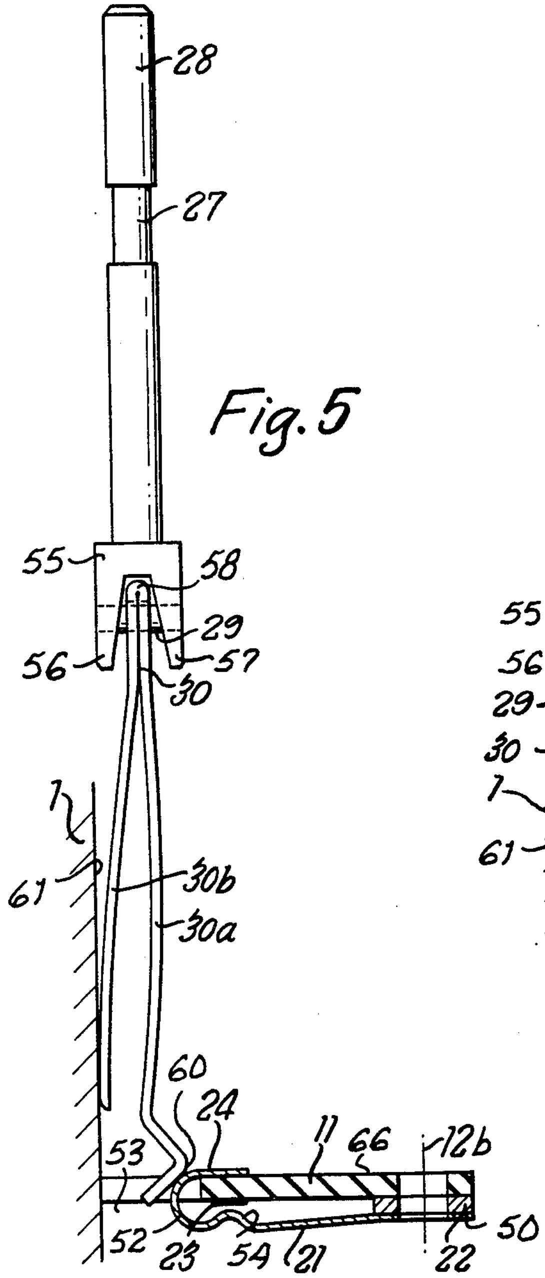
FIGS. 5 and 6 are detail views illustrating the switching action of a switching element which is shown, respectively, in the "OFF" and "ON" positions.
Figure 6:
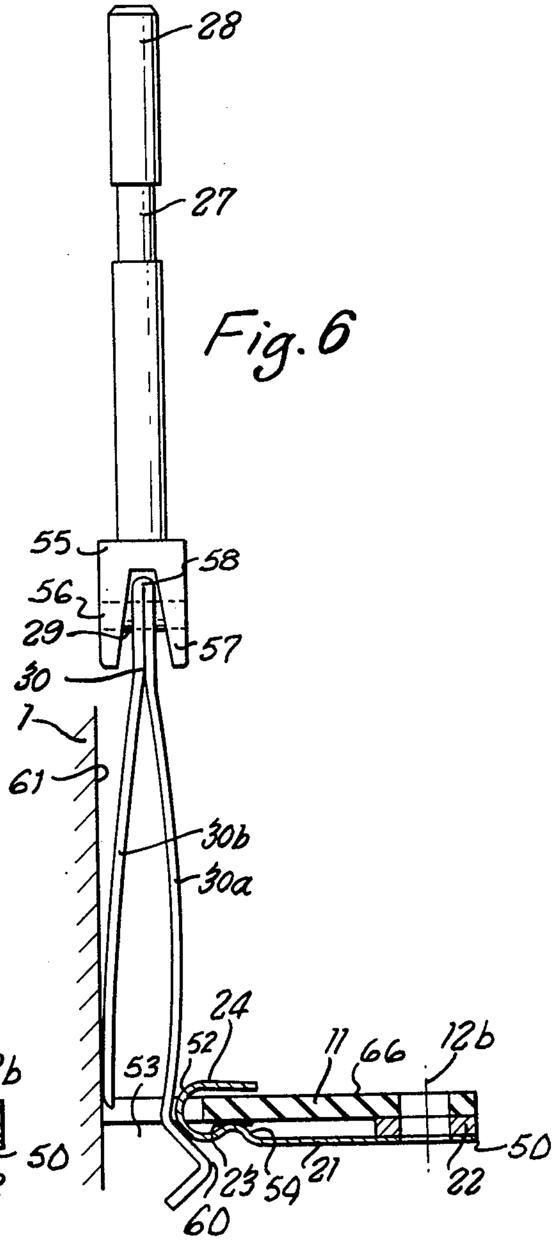

As shown in FIGS. 2, 5 and 6, the button 25 mechanically drives the flexible switch contact 21, the up position of the button 25 providing the "OFF" switch condition of FIGS. 2 and 5 and the down button position providing the "ON" switch condition of FIG. 6. The button 25 (FIGS. 2 and 3) has an inwardly projecting connecting fork portion 26. The button 25 moulded from an elastic material which enables the fork portion 26 to be snapped on to a neck portion 27 of a push-pull rod 28 which is slideably guided for longitudinal movement in the frame 2 and which, together with a leaf spring 30, provides the mechanical drive between the button 25 and the flexible switch contact 21. The rod 28 has a lower forked end 55, and a pin 29 extending between the fork limbs 56, 57 passes through a clearance hole at the upper end 58 of the bifurcated leaf spring 30 which has two arms 30a and 30b. This interconnection between the rod 28 and the spring 30 provides a universal coupling which allows free relative articulation in all directions. The spring arm 30a has a V-shaped end 60 which slideably engages the rounded U-shaped end 52 of the flexible switch contact 21, thereby moving the latter to perform the switching action in a manner which will be clear from FIGS. 5 and 6. The other spring arm 30b engages the internal wall 61 of the casing 1 to provide the switch spring force, the relative divergence of the arms 30a and 30b being chosen to provide an adequate spring force when the components are assembled. Examination of FIGS. 5 and 6 will make clear not only the manner in which up and down movement of the spring 30 displaces the flexible switch contact 21 to perform the switching action, but also that the switch 21 has a "snap" action with abrupt opening and closing of the contacts 24 and 54. The inter-engaging formations of the spring arm 30a and switch contact 21 are such that bistable operation is provided, i.e. both the button 25 and the switch contact 21 are stable in either the "OFF" or the "ON" position.

Referring to FIG. 4, when the shaver is switched on, current flows from the positive terminal 13a of the left-hand battery 10b along a conductive track 40 of the printed circuit 11, through the right-hand battery 10a from terminal 13d to positive terminal 13c along a conductive track 41, through the right-hand screw 17a, brush support 16a, brushes 15a, the motor windings, not shown, brushes 15b, brush support 16b, the left-hand screw 17b, along a conductive track 42 to the contact portion 23 (FIG. 6), through the conductive leaf 21 of the switch, along a conductive track 43, and thus to the negative terminal 13b of the left-hand battery 10b again. It will be appreciated that the battery terminals 13a, 13b, 13c and 13d are electrically connected to the brush supports 16a, 16b of the motor 44 through the conductive tracks 40, 41, 42 and 43 and the leaves 21, thus giving the important advantage of dispensing with the need for any flexible conductive leads at all. Moreover, as described, the electrical connections for recharging the batteries are made through the contact 18 and the casing 1, or screws 12, again requiring no flexible conductive leads.

A further advantage provided by the described arrangement is that there is no mechanical attachment between the switch control elements (button 25, rod 28 and spring 30) and the electrical module provided by the subassembly of motor 44 (brush supports 16*a*, 16*b* and brushes 15*a*, 15*b*), batteries 10*a*, 10*b* and circuit board 11 on which the flexible switch contact 21 is movably mounted. Thus the switch including the brush supports 16*a*, 16*b*, and brushes 15*a*, 15*b* can be handled and treated as separate entities until the final assembly of the shaver.

In a modified arrangement, not shown, the batteries are of the kind having their positive and negative terminals at opposite ends thereof. The battery end bearing the positive terminal is urged, for example by spring pressure, into direct electrical contact with a respective track on the board 11, and the opposite battery end bearing the negative terminal is in electrical connection with another track by a conductive path comprising the casing 1. The use of flexible conductive leads can thus still be avoided and the advantage is further obtained in that the batteries are easier to remove for repair or replacement due to the absence of solder.

We claim:

1. A battery-powered electric dry shaver comprising:
a casing;
a printed circuit board received in said casing and having a plurality of conductive tracks;
an electric motor received in said casing and having conductive brush supports, and means mechanically mounting said conductive brush supports on said printed circuit board in direct electrical connection with respective first and second conductive tracks of said board;
rechargeable battery means being received in said casing and having positive and negative terminals, and means mounting said battery means in said casing with said positive and negative terminals respectively being in electrical connection with said first conductive track and a third conductive track of said board; and
electric switch means received in said casing and including a conductive switching element, and means mounting said switching element on said board for movement between an "OFF" position and an "ON" position, said switching element in said "ON" position electrically interconnects said second conductive track to said third conductive track of said board, whereby to connect said battery terminals to said brush supports through said switching element and said conductive tracks, to permit current to flow from said battery to said motor to drive said shaver.

2. A shaver according to claim 1 including a charging terminal disposed in a socket, said socket being adapted to receive a contact pin of a battery charger, said terminal being electrically connected to said second conductive track of said board.

3. A shaver according to claim 2 including means electrically connecting said charging terminal to one of said brush supports.

4. A shaver according to claim 1 including an insulating brush holder, said brush holder carrying said brush supports.

5. A shaver according to claim 4 wherein said motor includes an iron core, and said brush holder includes a portion extending in engagement with said iron core to locate said brush holder relative to an axis of rotation of said motor.

6. A shaver according to claim 4 wherein said board is provided with an aperture therethrough, said brush holder includes a projection extending through said aperture to locate said board relative to said brush holder.

7. A shaver according to claim 1 wherein said means mechanically mounting said brush supports on said board comprise conductive screws, said board is provided with apertures therethrough adjacent to said first and second conductive tracks, and said brush supports are provided with respective threaded bores, said screws extending through said board apertures in electrical contact with said first and second conductive tracks and into said threaded bores in said brush supports.

8. A shaver according to claim 7 wherein said board apertures for said conductive screws are arcuate about the motor axis of rotation to permit angular adjustment of the position of the brushes supported by said brush supports relative to the motor commutator.

9. A shaver according to claim 1 including a frame, and means securing said frame within said casing, said frame supporting and locating a core of said motor.

10. A shaver according to claim 1 wherein said switch includes a finger-operable element exposed to the exterior of said casing, mechanical means operably interconnecting said finger-operable element and said conductive switch element, said mechanical means including a portion resiliently urged into engagement with said conductive switch element, whereby there is no mechanical attachment between said mechanical means and said conductive switch element.

11. A shaver according to claim 10 wherein said conductive switch element comprises a flexible conductive leaf having first and second opposite end portions, and means for fixing said first end portion to said board in electrical contact with said third conductive track.

12. A shaver according to claim 11 wherein said second end portion of said flexible conductive leaf is U-shaped and straddles the thickness of the board, opposite limbs of said U engaging said board in respective "ON" and "OFF" positions of said switch.

13. A shaver according to claim 12 wherein said mechanical means comprises a leaf spring disposed between a wall of said casing and said U-shaped portion, said leaf spring having a V-shaped portion resiliently urged into engagement with said U-shaped portion, whereby movement of said V-shaped portion effects a snap-action movement of said U-shaped portion between said "ON" and "OFF" positions.

14. A shaver according to claim 1 wherein said means mounting said battery comprises means mechanically mounting said battery on said board with said positive and negative terminals in direct electrical connection with said first and second conductive tracks of said board.

15. A shaver according to claim 1 wherein said battery means include two batteries each being generally cylindrical and disposed in the casing on opposite sides of the motor substantially parallel to said axis of rotation of said motor, said battery terminals and said motor brush supports being disposed at the same end of the casing, and mounted on said printed circuit board extending laterally within the casing adjacent to said same end thereof.

* * * * *